United States Patent
Wachter et al.

(10) Patent No.: US 7,430,053 B2
(45) Date of Patent: Sep. 30, 2008

(54) TRACKING COMPONENT USAGE IN A PRINTING DEVICE

(75) Inventors: Roman T. Wachter, Boise, ID (US); Jeetendra Kumar, Boise, ID (US); Nataraj Kumar Gobbak, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 970 days.

(21) Appl. No.: 10/401,500

(22) Filed: Mar. 27, 2003

(65) Prior Publication Data

US 2004/0207865 A1      Oct. 21, 2004

(51) Int. Cl.
*H04N 1/29*      (2006.01)
(52) U.S. Cl. .................. 358/1.14; 358/1.15; 358/1.16; 347/19; 399/12; 399/24
(58) Field of Classification Search ................ 358/1.14, 358/1.16; 713/300; 347/86, 214, 19; 399/12, 399/24, 27
See application file for complete search history.

(56) References Cited

U.S. PATENT DOCUMENTS

| | | | | |
|---|---|---|---|---|
| 5,530,461 A | * | 6/1996 | Sakuma | 347/23 |
| 5,995,774 A | * | 11/1999 | Applegate et al. | 399/27 |
| 6,036,458 A | * | 3/2000 | Cole et al. | 417/477.2 |
| 6,390,590 B1 | * | 5/2002 | Hansburg | 347/19 |
| 6,658,219 B1 | * | 12/2003 | Ito et al. | 399/27 |
| 6,672,695 B1 | * | 1/2004 | Naka et al. | 347/7 |
| 6,808,245 B2 | * | 10/2004 | Katayama | 347/19 |
| 6,923,531 B2 | * | 8/2005 | Saruta | 347/86 |
| 6,971,732 B1 | * | 12/2005 | Seshimo et al. | 347/19 |
| 6,975,816 B2 | * | 12/2005 | Ito et al. | 399/12 |
| 7,031,012 B1 | * | 4/2006 | Serizawa | 358/1.16 |
| 7,267,000 B1 | * | 9/2007 | Usui et al. | 347/7 |
| 7,376,362 B2 | * | 5/2008 | Kajikawa | 399/12 |
| 2004/0233470 A1 | * | 11/2004 | Wachter et al. | 358/1.14 |
| 2006/0152775 A1 | * | 7/2006 | Itoyama et al. | 358/504 |
| 2006/0192993 A1 | * | 8/2006 | Omotani | 358/1.15 |
| 2006/0263105 A1 | * | 11/2006 | Able et al. | 399/24 |
| 2007/0183795 A1 | * | 8/2007 | Burchette et al. | 399/12 |

* cited by examiner

*Primary Examiner*—Kimberly A Williams
(74) *Attorney, Agent, or Firm*—Matthew L. Wade (57) ABSTRACT

A printing device can receive a replaceable component that includes an integrated memory. The integrated memory can store an indicator for indicating a condition of the component. The printing device can retrieve the indicator from the integrated memory. The printing device can determine from the indicator the condition of the component. The printing device can monitor for an occurrence of a trigger event. The printing device can, if the component is determined to be in a first condition and a trigger event occurs, increment a component usage count. The component usage count can be stored in a memory internal to the printing device.

15 Claims, 9 Drawing Sheets

TRACKING COMPONENT USAGE IN A PRINTING DEVICE

BACKGROUND OF THE INVENTION

Field of the Invention

Printing devices may include one or more components that are replaced (sometimes more than once) over the lifetime of the device.

It may be desirable to determine the number of times a particular component within a printing device has been replaced for any number of reasons. For example, such information could be useful in assessing the reliability of the printing device and/or the reliability of the component itself. Alternatively or in addition to, this information may be useful in determining how many replacement components were purchased over the lifetime of the printing device.

Providing the ability to track the number of times a component in a printing device has been replaced presents a problem. Improved ways are needed to solve this problem.

DESCRIPTION

Figure 1:
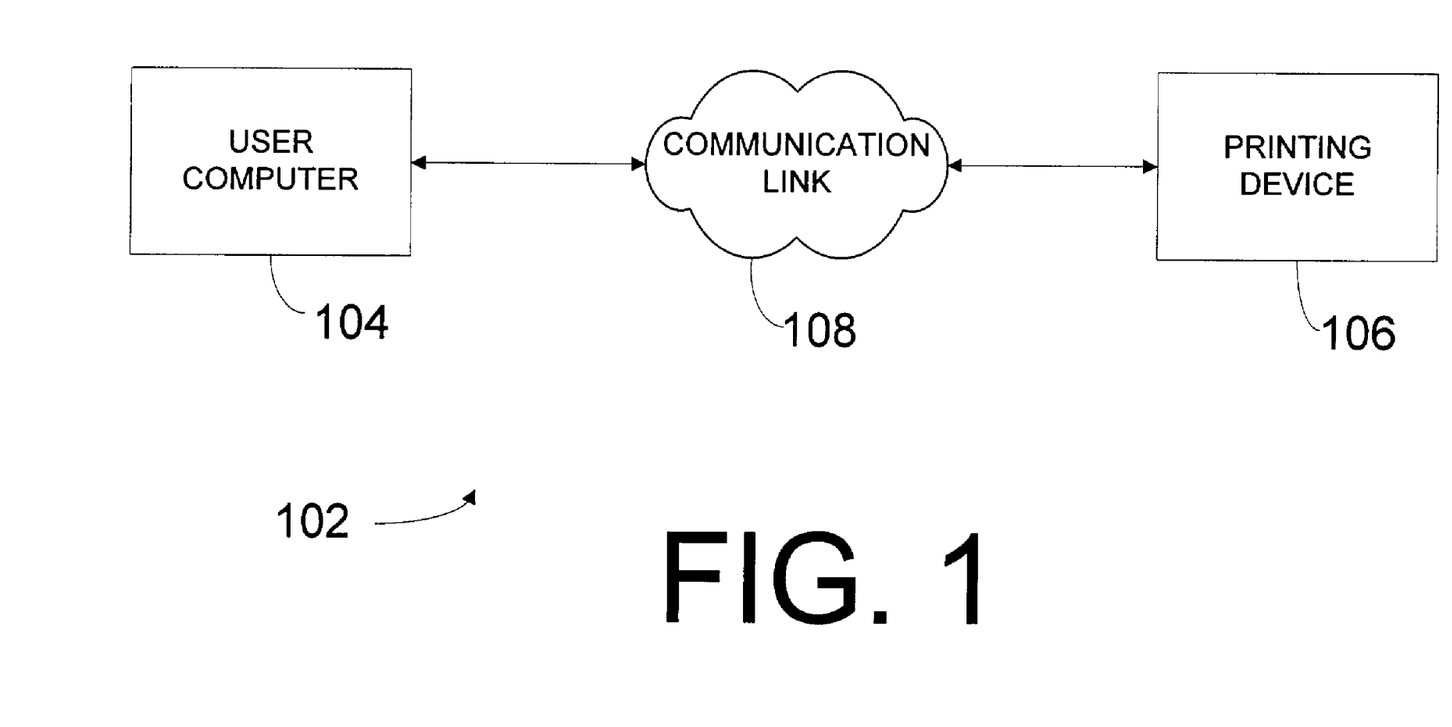
FIG. 1 illustrates an exemplary printing system.

FIG. 1 illustrates a printing system 102 that incorporates one example embodiment of the invention.

As shown, the printing system 102 includes a user computer 104 connected to a printing device 106 over a communication link 108.

The user computer 104 may represent any type of computer that can transmit a print job to the printing device 106. Thus, for example, the user computer 104 may represent a personal computer, a personal digital assistant and/or a cell phone, etc.

The communication link 108 may represent any type of communication path that can enable the user computer 104 to transmit a print job to the printing device 106. Thus, for example, the communication link 108 may represent a cable, a wireless communication path, a network system, and/or the INTRANET, etc.

The printing device 106 may represent any type of device that can convert a print job, received over the communication link 108, into a printed form. Thus, for example, the printing device 106 may represent a laser printer, an ink printer, a digital printing press, etc. The printing device 106 may provide more than just a printing function. For example, the printing device 106 may allow a walk-up user to scan hard copy documents, transmit e-mails, etc.

Components of the Exemplary Printing Device

Figure 2:
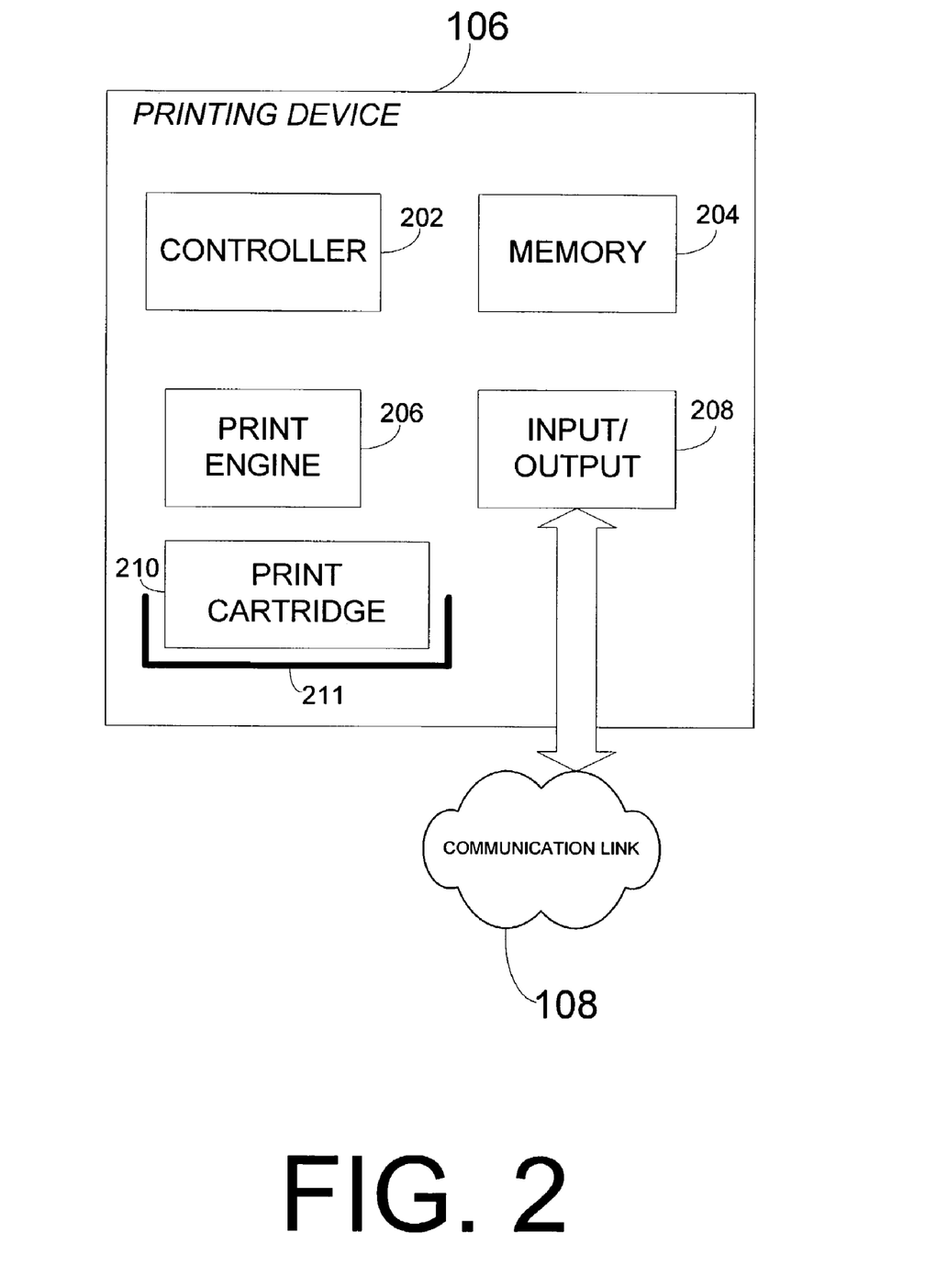
FIG. 2 illustrates some of the components of an exemplary printing device.

FIG. 2 is a high-level block diagram showing some of the components of the exemplary printing device 106.

As shown, the printing device 106 includes a controller 202, a memory 204, a print engine 206, an input-output (I/O) port 208 and a replaceable print cartridge 210.

Additionally, the printing device 106 includes a cartridge receiving station 211 that receives and holds the print cartridge 210 in the printing device. The cartridge receiving station 211 may include various mechanical features to allow a user to install and replace the print cartridge 210 with another cartridge (not shown). In some implementations, the cartridge receiving station 211 may be configured to move the print cartridge 210 during a printing operation. In other implementations, the cartridge receiving station 211 may hold the print cartridge 210 in a stationary position during a printing operation.

The controller 202 controls the operation of the printing device 106 and can detect when a print cartridge is installed into the printing device 106. In order to enable these functions, the controller 202 may include various hardware circuits, one or more sensors, one or more processors, and/or computer readable instructions (e.g., firmware, software, etc.). The computer readable instructions may be stored in the printer memory 204 and executed by the controller 202.

The printer memory 204 may represent any type of device or devices that can electronically store information. For example, the printer memory 204 may represent volatile and/or non-volatile memory components.

The I/O port 208 enables the printing device 106 to communicate with the user computer 104 over the communication link 108.

The print engine 206 includes the appropriate hardware to enable the printing device 106 to generate printed output. The print engine 206 may enable the printing device 106 to print in color, in monochrome, or both.

It is also noted that the print engine 206 may employ any type of printing technology that uses one or more print materials (e.g., liquid toner, dry toner, ink, etc.) to generate printed output. For example, the print engine 206 may represent a laser print engine that uses dry toner and/or liquid toner to place marks on a print medium. In other implementations, for example, the print engine 206 may represent an ink jet print engine that uses ink to place marks on a print medium.

Figure 3:
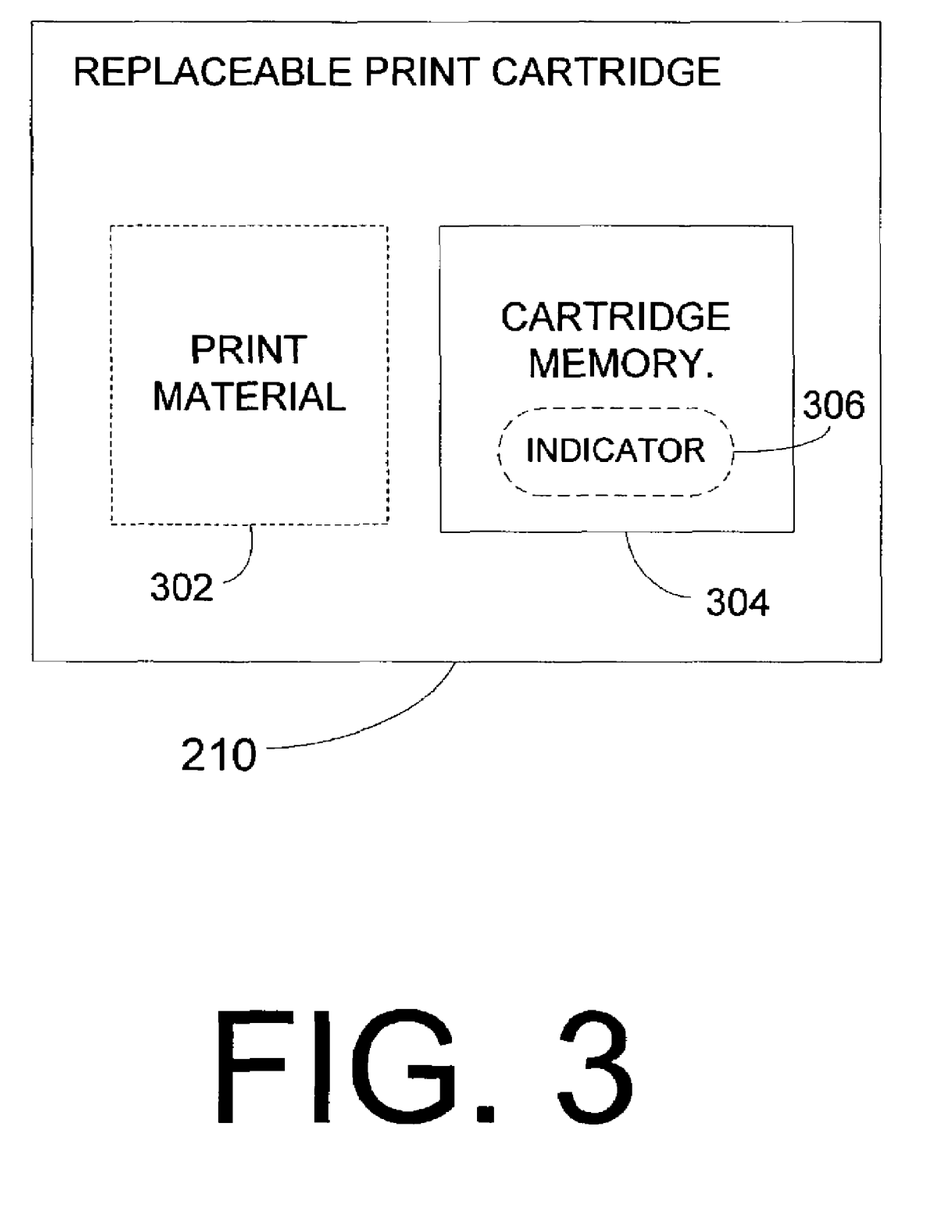
FIG. 3 illustrates certain aspects of an exemplary print cartridge.

FIG. 3 is a high-level block diagram illustrating certain aspects of the print cartridge 210. As shown, the print cartridge 210 includes a supply of print material 302. As indicated above, the print material 302 may be, for example, liquid toner, dry toner, ink, etc. When the print cartridge 210 is installed, the print engine 206 can consume the print material 302 in order to place marks on a print medium.

Additionally, the print cartridge 210 includes a non-volatile memory 304. The cartridge memory 304 is, in this example, an integral part of the cartridge 210.

As shown, the cartridge memory 304 stores an indicator 306. The indicator 306 is electronic data that describes the condition of the print cartridge 210. In this example, the indicator 306 indicates whether the print cartridge 210 is in a "used" or in an "unused condition".

For purposes of this document, a replaceable component (e.g., a print cartridge) is considered to be in an "unused condition" if the component has not yet been used by a printing device. Furthermore, a print cartridge is considered to be in a "used condition" if the component has been used by a printing device.

As noted above, the cartridge memory 304 is an integrated part of the print cartridge 210. When the print cartridge 210 is installed in the printing device 106, the printing device controller 202 can both read and write data to the cartridge memory 304.

In some implementations, for example, the cartridge memory 304 may reside on an outer surface of the print cartridge 210 at a pre-determined location. The printing device 106 may include an internal communication system that is configured so that when the print cartridge 210 is installed in the printing device, the system comes into electrical contact with the cartridge memory 304. When the internal communication system makes electrical contact, the controller 202 can then read/write data to the cartridge memory 304.

In other implementations, for example, the controller 202 may communicate wirelessly with the cartridge memory 304. For example, the cartridge memory 304 may represent a radio frequency identification (RFID) memory tag. A print cartridge that includes an RFID memory tag is further described in U.S. Pat. No. 6,332,062. That patent is incorporated herein by reference.

Figure 4:
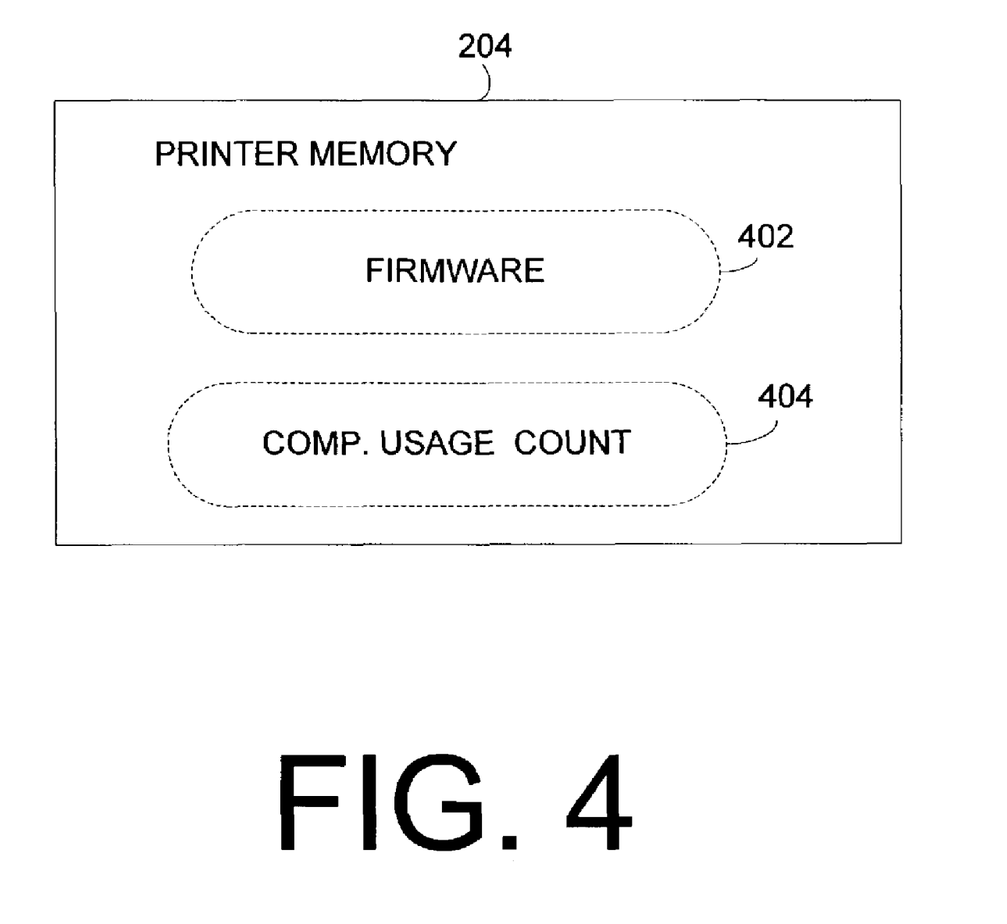
FIG. 4 illustrates an aspect of an internal memory of the exemplary printing device.

FIG. 4 illustrates an aspect of the internal memory 204 of the printing device 102. As shown, stored in the printer memory 204 is firmware 402 and a "component usage count" 404.

For purposes of this document, the phrase "component usage count" refers to the number of times a component that meets certain pre-determined criteria has been received and used by the printing device.

Figure 5A:
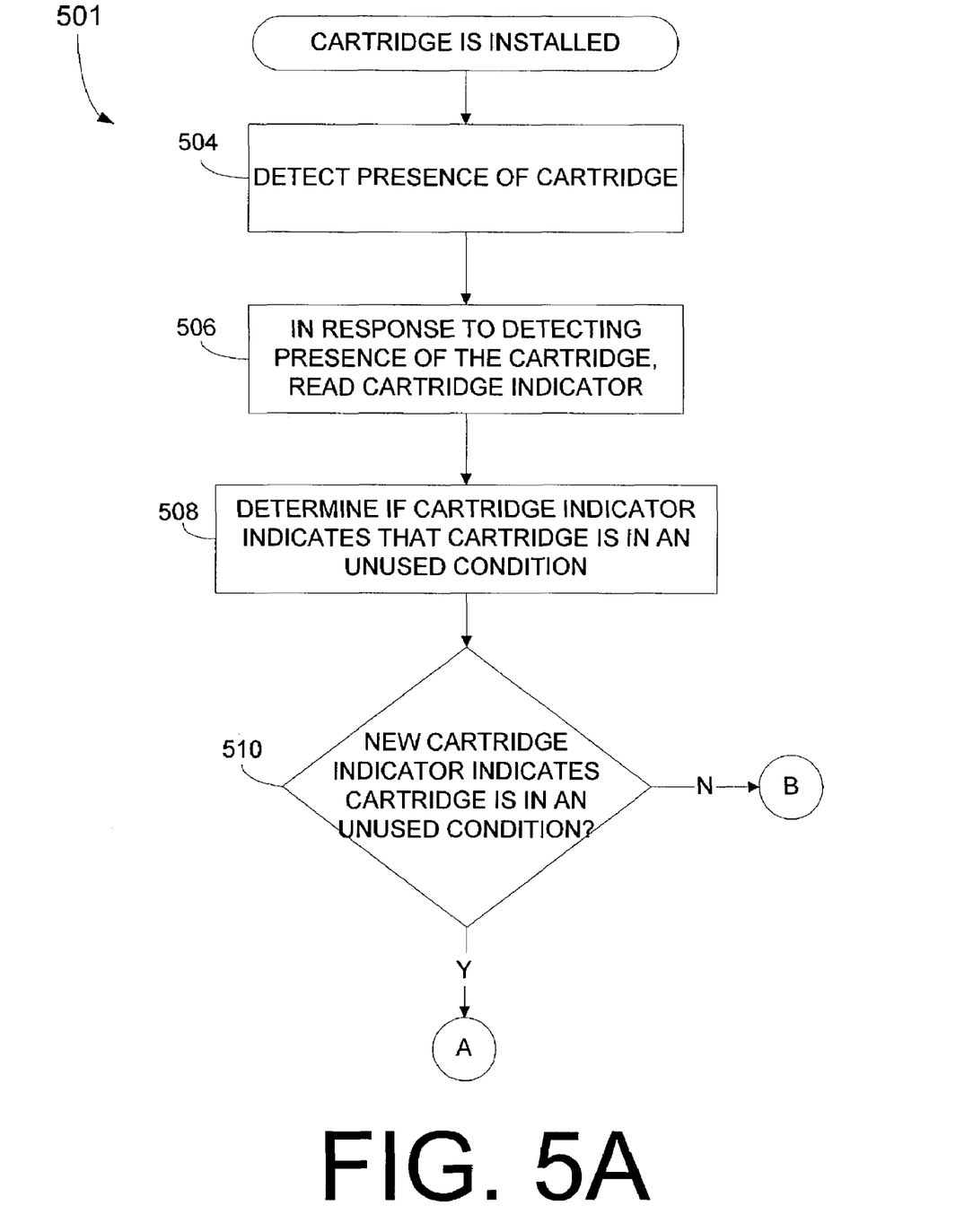
FIG. 5A illustrates an exemplary procedure to maintain a component usage count.
Figure 5B:
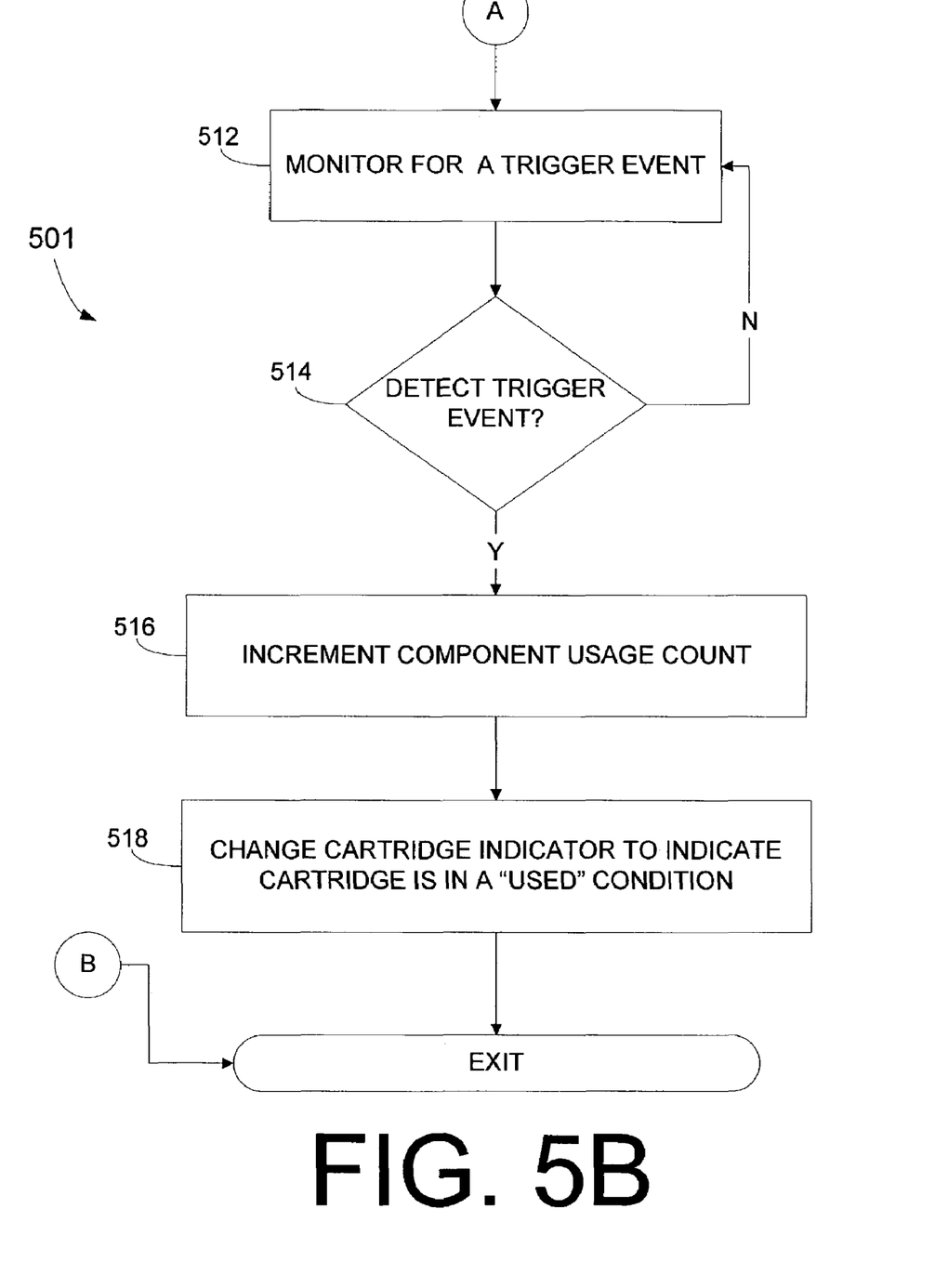
FIG. 5B further illustrates the exemplary procedure.

In this example, the component usage count 404 is the number of unused print cartridges received at the receiving station 211 and then used by the printing device 102. Operation of the Exemplary Printing Device FIG. 5A and FIG. 5B is used to illustrate a procedure 501 the controller 202 may follow to maintain the component usage count 404. It is noted that the controller 202 may perform the procedure 501, in whole or in part, under the direction of the firmware 402.

Referring to FIG. 5A, it is assumed that the print cartridge 210 is installed into the cartridge receiving station 211. The controller 202 detects the presence of the print cartridge 210 (act 504).

In response to detecting the presence of the print cartridge 210, the controller 202 proceeds to read the indicator 306 from the cartridge memory 304 (act 506).

The controller 202 then evaluates the indicator 306 to determine if the print cartridge 210 is in an "unused" or in a "used" condition (act 508).

If the controller 202 determines that the print cartridge 210 is in a "used" condition, the procedure 501 ends (see FIG. 5B).

If, however, the controller 202 determines that the print cartridge 210 is in an unused condition, the printing device 106 proceeds to monitor for an occurrence of a "trigger event" (See FIG. 5B, act 512).

It is noted that a trigger event may be any suitable event that indicates the print cartridge is about to be used, is being used or has been used.

For example, trigger events may include one or more of the following events:

a) The printing device 106 receiving a print job;
b) The printing device 106 consuming the print material 302;
c) The printing device 106 placing a mark on a print medium; and/or
d) The printing device 106 printing a page.

It is also noted that those events that classify as a "trigger event" may be pre-defined by the manufacture, a vendor and/or the user.

In response to detecting a trigger event (act 514), the controller 202 proceeds to increment the component usage count 404 by one (act 516).

Additionally, the controller 202 proceeds to modify the indicator 306 (stored in the cartridge memory 304) so that it now indicates that the print cartridge 210 is in a "used" condition (act 518).

Retrieval of Component Usage Count

It is noted that the printing device 106 may allow a user to retrieve the component usage count 404 in any number of ways. For example, the printing device 106 may allow a user to submit a request for the component usage count 404. The request may be submitted via a local user interface of the printing device 106 and/or over the communication link 108.

The printing device 106 may respond to the request by, for example, displaying the present value of the component usage count 404 on a local or a remote display. Alternatively, the printing device 106 may allow a walk-up user to print the component usage count 404.

It is noted that in some implementations, a copy of the component usage count 404 may be stored (by operation of the printing device) in the cartridge memory 304. In these implementations, the component usage count 404 may be retrieved directly from the cartridge memory 304 in any number of ways.

For example, when the print cartridge 210 is replaced, it may be physically sent to a recycling center. The component usage count 404 may be retrieved from the cartridge memory 304 at the recycling center and stored in a database.

It is also noted that the component usage count may be used for any number of purposes. For example, the component usage count may be one indicator of how many unused print cartridges are received and then used over the lifetime of the printing device 106. This information, may in turn, be used to determine the revenue that is generated (i.e., by the purchase of print cartridges) from the use of the printing device 106.

Other Example Embodiments

It is also noted that the present invention may be embodied in the form of a "computer-readable medium". As used herein, the phrase "computer-readable medium" can refer to any medium that can contain, store or propagate computer executable instructions. Thus, in this document, the phrase "computer-readable medium" may refer to a medium such as an optical storage device (e.g., a Compact Disc), a magnetic storage device (e.g., a magnetic tape), a semi-conductor storage device, etc. The phrase "computer-readable medium" may also refer to signals that are used to propagate the computer executable instructions over a network or a network system, such as the Public Internet.

Figure 6:
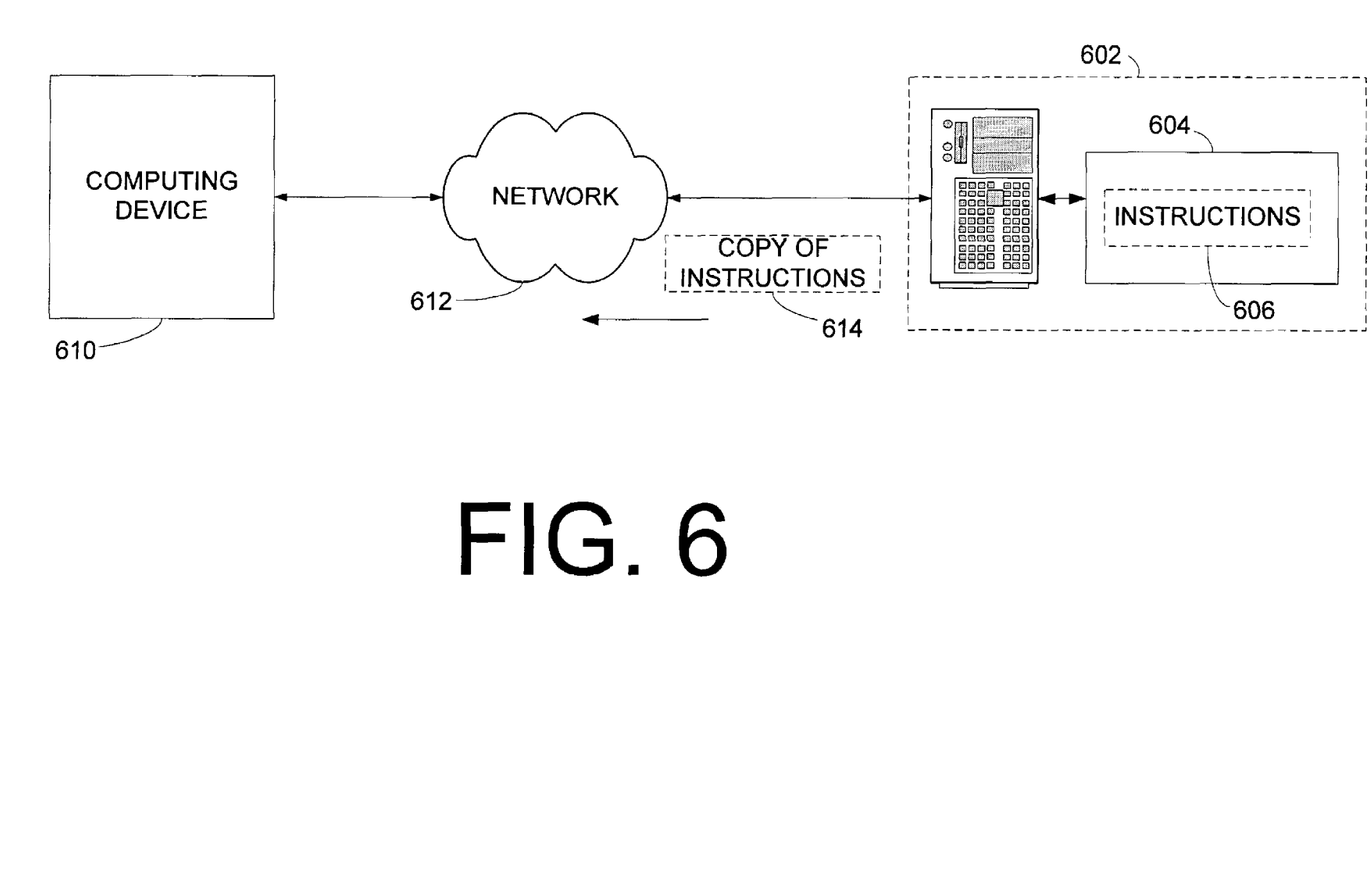
FIG. 6 illustrates an exemplary server system.

FIG. 6 illustrates additional embodiments of the invention. FIG. 6 shows a server system 602. The server system 602 includes a memory 604 that stores a set of computer readable instructions 606. The computer readable instructions 606 are executable by a processor in a printing device to perform, for example, the exemplary procedure illustrated in FIG. 5A and FIG. 5B or the exemplary procedure (described below) illustrated in FIG. 8.

As shown, the server system 602 is connected to a computing device 610 via a network 612. The network 612 may include, for example, the Public Internet. The server system 602 can transmit a copy of the computer readable instructions 606 to the computing device 610. The server system 602 performs this function by generating and transmitting a set of signals 614 that embody the instructions.

It is noted that the memory 604 is a computer-readable medium and represents an embodiment of the invention. Additionally, the signals 614 used to propagate, over the network 614, the instructions 606 are also considered a type of "computer-readable medium". These signals, therefore, represent another embodiment of the invention.

Figure 7:
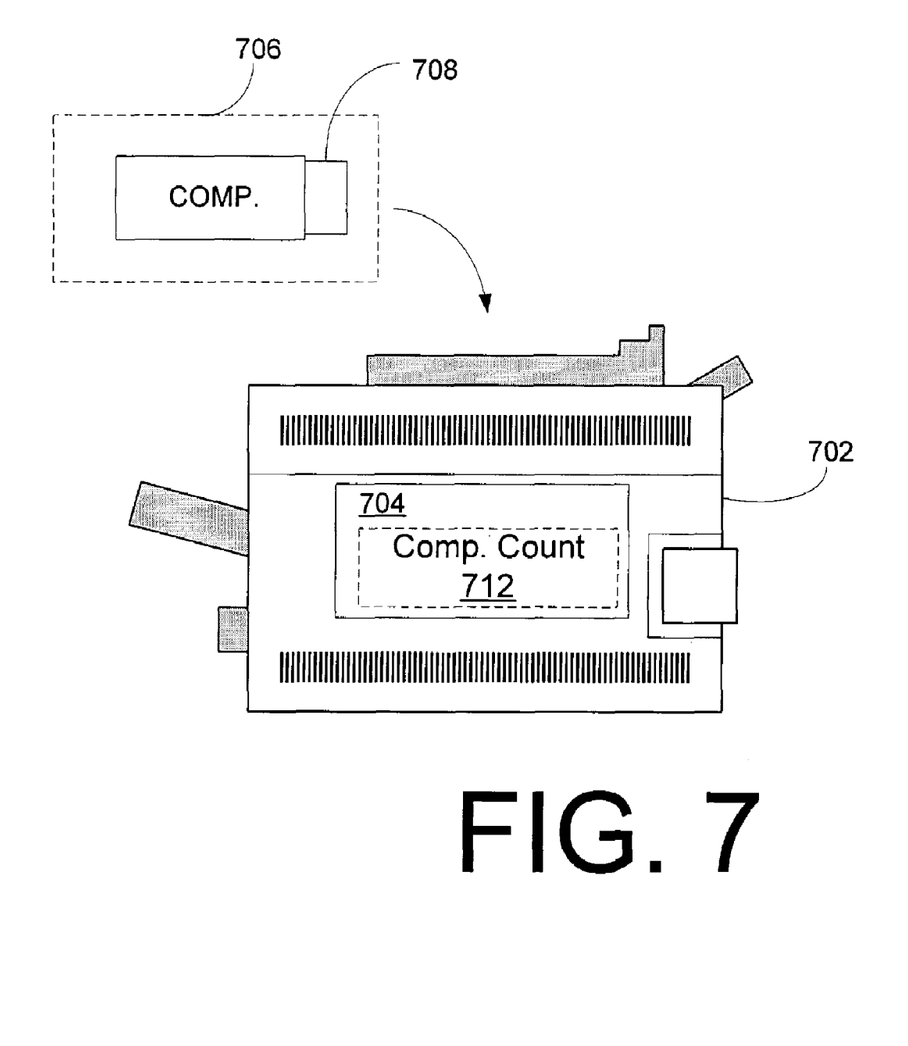
FIG. 7 illustrates another exemplary printing device.

FIG. 7 illustrates yet another embodiment of the invention in the form of a printing device 702. The printing device 702 may represent any type of device (including standalone or connected printing devices) that performs a printing function.

The printing device 702 has an internal memory 704 and uses a replaceable component 706. The replaceable component 706 may represent any component in the printing device that may be replaced during the life of the printing device 702.

Thus, for example, the component 706 may represent a print cartridge, a print engine component (e.g., a fuser assembly, an image transfer belt, etc.), an access panel, etc.

The replaceable component 706 includes an integrated memory 708. The component memory 708 stores an indicator that indicates the present condition of the replaceable component 706. The indicator may indicate, for example, if the replaceable component 706 is unused, used, refurbished, etc.

As shown, the internal printer memory 704 stores a component usage count 712. In this example, the component usage count 712 is a count of the number of components that:
 a) meet certain criteria; and
 b) were initially received by the printing device 702 in an unused condition and then used by the printing device 702.

It is noted that the replaceable component 706 meets the criteria.

Figure 8:
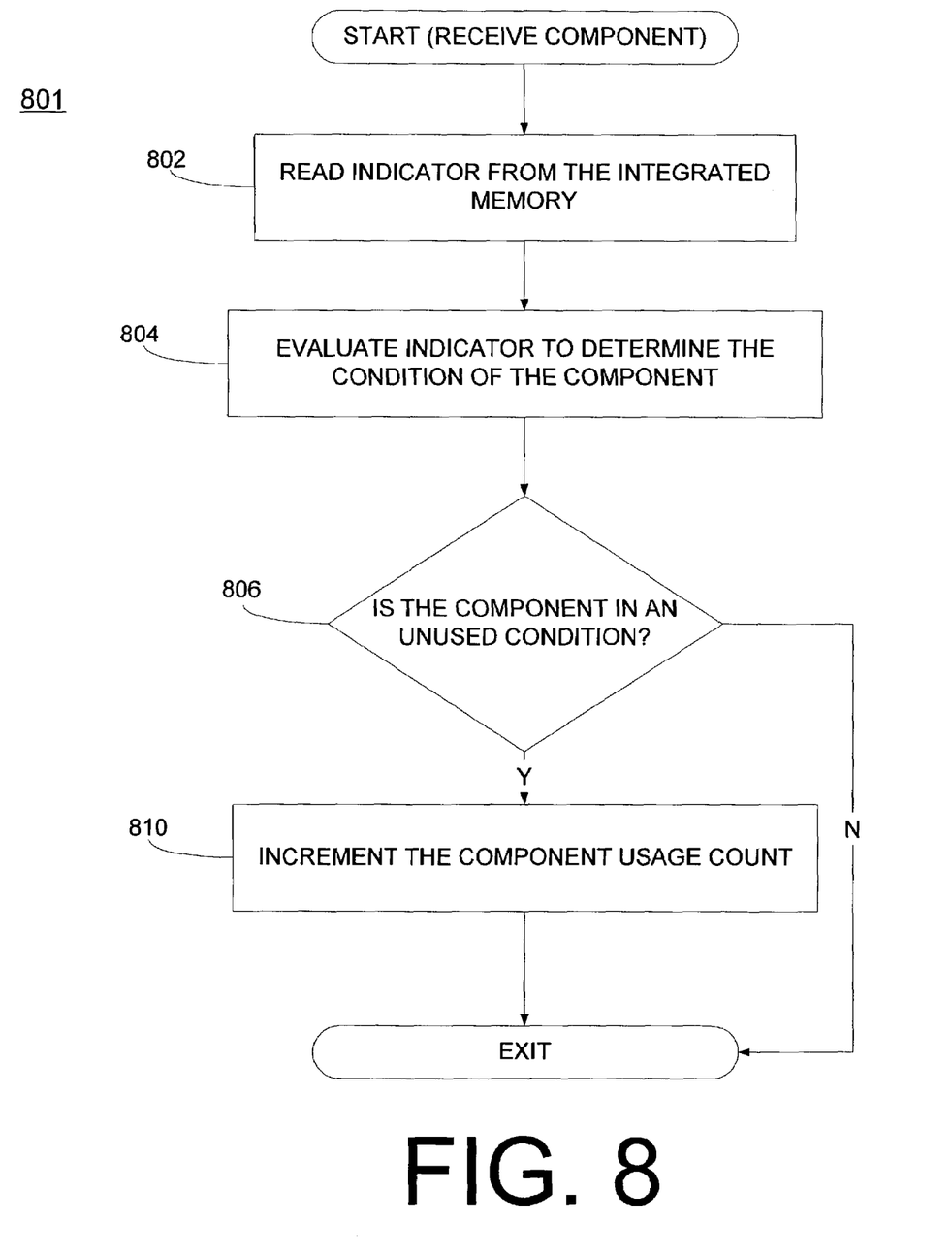
FIG. 8 illustrates another exemplary procedure to maintain a component usage count.

FIG. 8 is a flow diagram illustrating a procedure 801. The printing device 702 may follow the procedure 801 to maintain the component usage count 712.

As shown, the procedure 801 begins when the printing device 702 receives the replaceable component 706. After the replaceable component 706 is received, the printing device 702 reads the indicator from the component memory 708 (block 802). The printing device 702 proceeds to evaluate the indicator to determine the condition of the replaceable component 706. If the component is determined not to be in an unused condition, the procedure 801 ends (block 806).

If, however, the printing device 702 determines that the replaceable component 706 is in an unused condition, the printing device 702 responds by incrementing the component usage count 712.

Although several specific embodiments of the invention have been described and illustrated, the invention is not to be limited to specific forms or arrangements of parts so described and illustrated. The invention is limited only by the claims and the equivalents thereof.

What is claimed is:

1. A method for counting replaceable components that are received by a printing device, comprising, by the printing device:
 a) receiving a replaceable component that includes an integrated memory, where the integrated memory stores an indicator for indicating a condition of the component; thereafter
 b) retrieving the indicator from the integrated memory;
 c) determining from the indicator the condition of the component;
 d) monitoring for an occurrence of a trigger event;
 e) if the component is determined to be in an unused condition and the trigger event occurs, then incrementing a component usage count by one; and
 wherein the component usage count is stored in a memory internal to the printing device;
 wherein the trigger event is an event that indicates the printing device has consumed at least a portion of the print material.

2. The method of claim 1, wherein the component is a print cartridge for providing a supply of print material to the printing device.

3. The method of claim 1, further comprising:
 f) receiving a user initiated request to output the component usage count;
 g) responding to the request by outputting the component usage count to the user.

4. The method of claim 3, wherein act (g) is performed by printing the value of the component usage count.

5. The method of claim 1, further comprising:
 f) if the trigger event occurs, modifying the indicator stored in the integrated memory so that the indicator indicates the print cartridge is in a used condition.

6. The method of claim 1, wherein the component usage count represents the number of unused print cartridges received and then used by the printing device.

7. The method of claim 1, wherein the component is a print cartridge that contains a print material and the trigger event is selected from a list consisting of:
 receiving a print job,
 consuming the print material,
 placing a mark on a print medium, and
 printing a page.

8. The method of claim 1, wherein the printing device is a laser printer or an ink printer.

9. The method of claim 1, further comprising:
 f) writing the component usage count to the integrated memory of the component.

10. A printing device capable of receiving and using a replaceable print cartridge having a first memory, where the first memory stores an indicator for indicating whether the cartridge is in an unused or a used condition, the printing device comprising:
 a second memory for storing a count of the number of cartridges that were received by the printing device in an unused condition and then used by the printing device;
 a controller configured to:
  a) automatically read the indicator from the first memory after the cartridge is received by the printing device;
  b) use the read indicator to determine if the cartridge was received in an unused condition; thereafter
  c) determine when the printing device has used the cartridge; and
  d) automatically increment the count by one if the cartridge is determined to have been received by the printing device in an unused condition and then used by the printing device.

11. In a printing device having internal memory and capable of using a replaceable component that includes an integrated memory that stores an indicator for indicating a condition of the component, a method comprising:
 (a) reading the indicator from the integrated component memory after the replaceable component is installed into the printing device;
 (b) evaluating the indicator to determine the condition of the replaceable component;
 (c) if the replaceable component is determined to be in an unused condition, then incrementing a component usage count, wherein the component usage count represents the total number of times the component has been received in an unused condition and then used by the printinci device; and (d) wherein the component usage count is stored in the internal memory of the printing device.

12. The method of claim 11, wherein the replaceable component is a print cartridge.

13. The method of claim 11, wherein the printing device includes a print engine and the replaceable component is a component of the print engine.

14. The method of claim 11, wherein the printing device is a laser printer and the replaceable component is a fuser assembly.

15. A computer-readable medium encoded with instructions, the instructions being executable by a processor in a printing device to:
  a) detect when a printing device has received a replaceable component that includes an integrated memory, where the integrated memory stores an indicator for indicating a condition of the component;
  b) use the indicator to determine a condition of the component;
  c) if the component is determined to be in unused condition, then incrementing a component usage count by one, wherein the component usage count represents the total number of times the component has been received in an unused condition and then used by the printing device.

* * * * *

UNITED STATES PATENT AND TRADEMARK OFFICE
CERTIFICATE OF CORRECTION

| | | |
|---|---|---|
| PATENT NO. | : 7,430,053 B2 | Page 1 of 1 |
| APPLICATION NO. | : 10/401500 | |
| DATED | : September 30, 2008 | |
| INVENTOR(S) | : Roman T. Wachter et al. | |

It is certified that error appears in the above-identified patent and that said Letters Patent is hereby corrected as shown below:

In column 7, line 4, in Claim 11, delete "printinci" and insert -- printing --, therefor.

Signed and Sealed this

Eighteenth Day of August, 2009

David J. Kappos
*Director of the United States Patent and Trademark Office*